Sept. 15, 1970          H. SULZER          3,529,242
STATIONARY SOUND RESPONSIVE VELOCIMETER
FOR AUTOMOBILE VEHICLES
Filed Aug. 9, 1967

United States Patent Office 3,529,242
Patented Sept. 15, 1970

---

3,529,242
STATIONARY SOUND RESPONSIVE VELOCIMETER FOR AUTOMOBILE VEHICLES
Henri Sulzer, Saint-Remy-les-Chevreuse, France, assignor to Compagnie Generale d'Electricite, Paris, France, a French corporation
Filed Aug. 9, 1967, Ser. No. 659,525
Claims priority, application France, Aug. 12, 1966,
73,070
Int. Cl. G01p 3/54
U.S. Cl. 324—166         4 Claims

ABSTRACT OF THE DISCLOSURE

A velocimeter for determining the velocity of moving objects including a grid formed of regularly spaced bars disposed vertically in parallel relationship for generating a periodic disturbance of the air at a rate which is the function of the speed of the object including means for transducing the periodic disturbance into an electrical signal of corresponding frequency to be detected by a frequency meter.

---

The invention relates to a speed measuring device, or stationary velocimeter, which is specially adapted to measure the speed of vehicles travelling along a road.

There already exist devices for measuring automotive vehicles travelling along a road, which make use of the phenomena of reflection of electromagnetic pulses by the moving structure. Other devices for detecting velocity are based upon an amplitude modulation frequency of a diffusion spectrum, which is proportional to the speed of the diffusing structure, i.e. the surface of an automobile upon which there impinges a coherent magnetic wave beam.

As compared with the known devices, the present invention is distinguished by its extreme simplicity of construction and application. It is known that a moving vehicle creates a compresional wave in the air. The front of this wave accompanies the vehicle and moves at the same speed as the latter. The invention utilizes the effect of this wave front on a fixed repetitive structure situated in its proximity.

In accordance with the invention, a velocimeter for automobiles includes a grid formed of regularly spaced bars disposed vertically in parallel relationship to the axis of the road surface, as well as a microphone device associated with an amplifier and with a frequency meter, which latter may be of any known type.

When the compressional wave front which accompanies the automobile travels past the grid, it sets up a periodic disturbance of the mass of air at a rate $V/p$, in which V is the speed of the vehicle in meters per second and $p$ the spacing between the bars in meters.

For example, for a speed $V=20$ m./s. (72 km./h.), with a spacing $p=0.01$ m., there will be obtained a frequency $f=2000$ c./s. It will be seen that there is obtained under these conditions a frequency which is clearly unaffected by engine noises.

Figure 1:
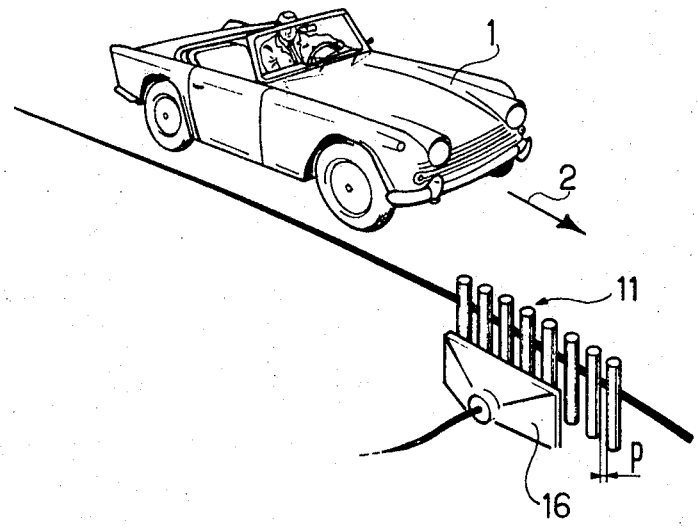
Figure 2:
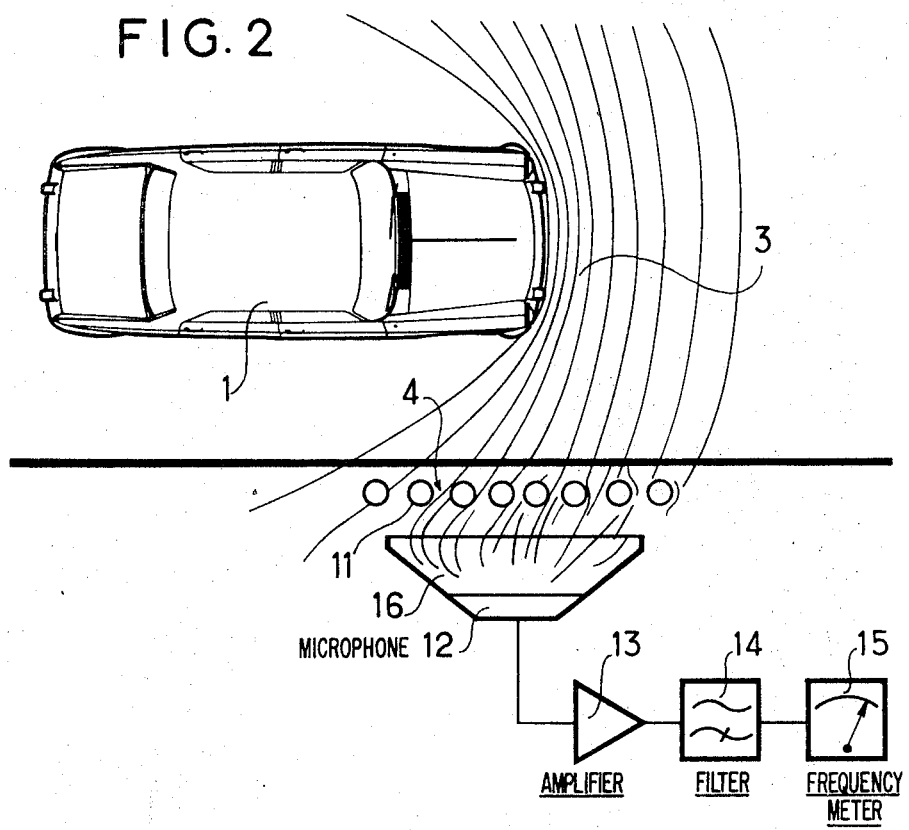

These and other features of the present will become more apparent from the following detailed description of the invention taken with the accompanying drawings, wherein:

FIG. 1 is a perspective view of the detector portion of the present invention located adjacent a road upon which a vehicle is traveling; and FIG. 2 is a top plan view partially schematic of the arrangement of FIG. 1 including the entire system in accordance with the invention.

FIGS. 1 and 2 diagrammatically illustrate an example of an installation in accordance with the invention, comprising a grid 11, a microphone 12 disposed opposite the grid 11, an amplifier 13 elastically connected to the microphone 12, a high-pass filter 14 and a frequency meter 15 connected in through the filter 14 to amplifier 13. The microphone 12 is surrounded by a screen 16 to prevent the effect of parasitic vibrations.

FIG. 1 specifically illustrates an automobile 1 circulating on a road in the direction of an arrow 2 and about to pass in front of the grid 11 formed of vertical bars having a spacing $p$ set up parallel to the direction of travel before the sound receiving device 16. As seen in FIG. 2, the automobile pushes before it a front of compressed air 3 whose edge comes to strike against the grid 11 and pass through the spaces 4 therein.

As indicated above, the interception of the compressional wave front, which is travelling at the same velocity as the vehicle, by the grid, made up of bars having a prescribed spacing, produces as a result of the interaction between the wave front and the spaced bars a periodic disturbance of the air at a unique rate which is a function of the speed of the wave front and the spacing of the bars. Thus, determination of the rate of the periodic disturbance of the air as a result of this interaction, with the spacing of the bars known, will provide the data necessary to determine the velocity of the moving wave front, and thus, the velocity of the vehicle.

The operation of the exemplary system depicted in the drawing is based upon the pickup of the periodic disturbance of the mass of air, which is in effect a sound wave, by the microphone 12 which transduces the wave into an electrical signal of corresponding frequency. This electrical signal is amplified in the amplifier 13 and then passed on to the filter 14 where all frequencies outside of the expected range of velocities are eliminated. The resultant signal is then applied to a frequency meter 15, which may be directly calibrated to read velocity.

It should be quite apparent that the system in accordance with the present invention is much simpler in construction and operation than known systems depending upon modulation techniques and Doppler principles and therefore results in more economy of manufacture and greater dependability of operation.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:
1. A velocimeter designed particularly for the measurement of the speed of vehicles travelling along a road, comprising, in combination,
   a grid formed of regularly spaced bars, disposed with a substantially vertical orientation at the side of the road, said bars arranged in a line which is substantially parallel to the side of the road, sound receiving means for picking up the disturbances of the air passing through said grid which are produced by a vehicle travelling past said grid, said grid being disposed between the road and said sound receiving means, and measuring means connected to said sound receiving means for measuring the frequency of said disturbances and providing therefrom an indication of the velocity of the vehicle.

2. Velocimeter according to claim 1, wherein said sound receiving means comprises a microphone, and said measuring means comprises an amplifier connected to said microphone, a high-pass filter and a frequency meter connected through said filter to said amplifier.

3. Velocimeter according to claim 1, wherein said grid is formed of closely spaced substantially parallel vertical bars.

4. Velocimeter according to claim 1 wherein said sound receiving means includes a transducer for translating a sound wave into an electrical signal of corresponding frequency and said measuring means comprises detection means for detecting the frequency of said signal.

References Cited

UNITED STATES PATENTS

| | | | |
|---|---|---|---|
| 2,016,036 | 10/1935 | Fitzgerald | 340—263 |
| 2,399,386 | 4/1946 | Read | 340—261 |
| 2,419,099 | 4/1947 | Wall | 73—489 |
| 2,875,998 | 3/1959 | Gunther | 73—506 |

GERARD R. STRECKER, Primary Examiner

M. J. LYNCH, Assistant Examiner

U.S. Cl. X.R.

181—0.5